US012648593B2

(12) United States Patent
Thorsen et al.

(10) Patent No.: US 12,648,593 B2
(45) Date of Patent: Jun. 9, 2026

(54) APPARATUS FOR HEATING AEROSOLIZABLE MATERIAL

(71) Applicant: Nicoventures Trading Limited, London (GB)

(72) Inventors: Mitchel Thorsen, Madison, WI (US); Luke Warren, London (GB)

(73) Assignee: Nicoventures Trading Limited, London (GB)

(*) Notice: Subject to any disclaimer, the term of this patent is extended or adjusted under 35 U.S.C. 154(b) by 627 days.

(21) Appl. No.: 18/003,008

(22) PCT Filed: Jun. 24, 2021

(86) PCT No.: PCT/EP2021/067432
§ 371 (c)(1),
(2) Date: Dec. 22, 2022

(87) PCT Pub. No.: WO2021/260155
PCT Pub. Date: Dec. 30, 2021

(65) Prior Publication Data

US 2023/0337740 A1 Oct. 26, 2023

Related U.S. Application Data

(60) Provisional application No. 62/705,430, filed on Jun. 26, 2020.

(51) Int. Cl.
*A24F 40/20* (2020.01)
*A24F 40/46* (2020.01)
(Continued)

(52) U.S. Cl.
CPC .............. *A24F 40/46* (2020.01); *A24F 40/51* (2020.01); *A24F 40/85* (2020.01); *H05B 3/06* (2013.01); *A24F 40/10* (2020.01); *A24F 40/70* (2020.01)

(58) Field of Classification Search
CPC .................................. A24F 40/46; H05B 3/06
See application file for complete search history.

(56) References Cited

U.S. PATENT DOCUMENTS 2,371,445 A 3/1945 Irvin
3,616,310 A 10/1971 Dorsey
(Continued)

FOREIGN PATENT DOCUMENTS

CN 104026746 9/2014
CN 111246764 6/2020
(Continued)

OTHER PUBLICATIONS

Japanese Reasons for Refusal received for Japanese Application No. 2022-576414, mailed on Aug. 13, 2024, 11 pages (5 pages of English Translation and 6 pages of Official Copy).
(Continued)

*Primary Examiner* — Philip Y Louie
*Assistant Examiner* — Charlotte Davison
(74) *Attorney, Agent, or Firm* — MERCHANT & GOULD P.C.

(57) ABSTRACT

An apparatus arranged to heat aerosolizable material to volatilize at least one component of the aerosolizable material. The apparatus includes a conductive coil defining an elongate receiving portion arranged to receive a consumable article including aerosolizable material. The conductive coil has a first end and a second end opposite the opposite the first end. The apparatus also includes a clamping structure including a first engagement portion arranged to apply a first force to the first end and a second engagement portion arranged to apply a second force, opposing the first force, to the second end, thereby providing a tension in the conductive coil.

36 Claims, 12 Drawing Sheets

(51) Int. Cl.

| | |
|---|---|
| ***A24F 40/51*** | (2020.01) |
| ***A24F 40/85*** | (2020.01) |
| ***H05B 3/06*** | (2006.01) |
| ***H05B 3/10*** | (2006.01) |
| *A24F 40/10* | (2020.01) |
| *A24F 40/70* | (2020.01) |

(56) References Cited

U.S. PATENT DOCUMENTS

| | | | | |
|---|---|---|---|---|
| 5,093,894 | A | 3/1992 | Deevi et al. | |
| 2013/0305504 | A1 | 11/2013 | Naito | |
| 2014/0261408 | A1 | 9/2014 | Depiano et al. | |
| 2015/0001206 | A1* | 1/2015 | Schlipf | H01C 3/14 219/544 |
| 2015/0101606 | A1 | 4/2015 | White | |
| 2016/0073692 | A1* | 3/2016 | Alarcon | A24F 40/46 131/329 |
| 2016/0106155 | A1 | 4/2016 | Reevell | |
| 2016/0120225 | A1 | 5/2016 | Mishra et al. | |
| 2016/0255876 | A1 | 9/2016 | Rostami | |
| 2017/0049156 | A1 | 2/2017 | Wang et al. | |
| 2017/0079326 | A1 | 3/2017 | Mironov | |
| 2017/0215474 | A1 | 8/2017 | Li | |
| 2017/0325510 | A1 | 11/2017 | Hu et al. | |
| 2017/0339749 | A1* | 11/2017 | Hutter, III | H05B 6/10 |
| 2017/0340011 | A1* | 11/2017 | Batista | A24F 40/46 |
| 2018/0027881 | A1* | 2/2018 | Chen | H05B 1/0227 |
| 2019/0191767 | A1 | 6/2019 | Wu | |
| 2020/0060341 | A1* | 2/2020 | Sebastian | A24F 40/46 |
| 2020/0093182 | A1 | 3/2020 | Monsalud et al. | |
| 2020/0297028 | A1 | 9/2020 | Chau | |
| 2020/0375256 | A1* | 12/2020 | Chong | A24F 40/51 |
| 2021/0186114 | A1 | 6/2021 | Lee | |
| 2021/0337870 | A1* | 11/2021 | Zhang | H01M 50/247 |
| 2022/0386698 | A1* | 12/2022 | Batista | H05B 6/44 |
| 2023/0044176 | A1* | 2/2023 | Yan | F28F 13/18 |
| 2023/0284695 | A1 | 9/2023 | Thorsen | |

FOREIGN PATENT DOCUMENTS

| | | | |
|---|---|---|---|
| EP | 3462932 | A1 | 4/2019 |
| EP | 3895561 | | 10/2021 |
| JP | 2003056901 | | 2/2003 |
| JP | 2005525479 | | 8/2005 |
| JP | 2006035216 | | 2/2006 |
| JP | 2007509681 | | 4/2007 |
| JP | 2013510962 | | 3/2013 |
| JP | 2014216287 | | 11/2014 |
| JP | 2015151180 | | 8/2015 |
| JP | 2016525341 | | 8/2016 |
| JP | 2017520263 | | 7/2017 |
| JP | 2017533732 | | 11/2017 |
| JP | 2018520664 | | 8/2018 |
| JP | 2018524984 | | 9/2018 |
| JP | 2020074269 | | 5/2020 |
| JP | 2019524079 | | 9/2021 |
| KR | 20100085223 | | 7/2010 |
| KR | 1020150143885 | | 12/2015 |
| KR | 101635340 | | 6/2016 |
| RU | 2643421 | C2 | 2/2018 |
| WO | 2016184978 | | 11/2016 |
| WO | 2017068094 | | 4/2017 |
| WO | 2019111103 | A1 | 6/2019 |
| WO | 2019178803 | | 9/2019 |
| WO | 2019234143 | | 12/2019 |
| WO | 2020121374 | | 6/2020 |

OTHER PUBLICATIONS

Japanese Reasons for Refusal received for Japanese Application No. 2022-578610, dated Aug. 27, 2024 10 pages (with English Translation).

PCT International Preliminary Report on Patentability received for PCT Patent Application No. PCT/EP2021/067561, mailed Jan. 5, 2023, 11 pages.

PCT International Preliminary Report on Patentability received for PCT Patent Application No. PCT/EP2021/067562, mailed Jan. 5, 2023, 12 pages.

PCT International Search Report and Written Opinion received for PCT Patent Application No. PCT/EP2021/067561, mailed Jan. 10, 2022, 17 pages.

PCT International Search Report and Written Opinion received for PCT Patent Application No. PCT/EP2021/067562, mailed Jan. 10, 2022, 18 pages.

PCT Invitation to Pay Additional Fees received for PCT Patent Application No. PCT/EP2021/067561, mailed Nov. 4, 2021, 9 pages.

PCT Invitation to Pay Additional Fees received for PCT Patent Application No. PCT/EP2021/067562, mailed Nov. 4, 2021, 10 pages.

The Physics Factbook by Harvey Kwan retrieved on May 4, 2025 from https://hypertextbook.com/facts/2007/HarveyKwan.shtml, 2007.

B.A. Vvedenskiy et al. The Great Soviet Encyclopedia, vol. 30, 1954, Moscow, "The Great Soviet Encyclopedia" Publishing House, pp. 39-40.

International Search Report and Written Opinion for International Application No. PCT/EP2021/067432, mailed on Oct. 15, 2021, 09 pages.

B.A. Vvedenskiy et al. The Great Soviet Encyclopedia, vol. 30, 1954, Moscow, "The Great Soviet Encyclopedia" Publishing House, pp. 39-40, 8 pages.

Nichrome Flat Heater Wire for Heating Elements, Amazon, first available May 10, 2016.

Impact of cigarettes filter length and diameter on cigarette smoke emissions, Poorlajal, 2019.

Steel Band Clamp, sold on Amazon, retrieved Jan. 11, 2025, available on Jun. 26, 2019, https://www.amazon.com/uxcell-Steel-Silicon-Spring-Manganese/dp/B07TLBLZD9.

* cited by examiner

200

700

APPARATUS FOR HEATING AEROSOLIZABLE MATERIAL

PRIORITY CLAIM

The present application is a National Phase entry of PCT Application No. PCT/EP2021/067432, filed Jun. 24, 2021, which claims priority from U.S. Provisional Application No. 62/705,430, filed Jun. 26, 2020, each of which is hereby fully incorporated herein by reference.

TECHNICAL FIELD

The present invention relates to an apparatus arranged to heat aerosolizable material.

BACKGROUND

Articles such as cigarettes, cigars and the like burn tobacco during use to create tobacco smoke. Attempts have been made to provide alternatives to these articles, which burn tobacco, by creating products that release compounds without burning. Examples of such products are so-called heat-not-burn products, also known as tobacco heating products or tobacco heating devices, which release compounds by heating, but not burning, the material. The material may be for example tobacco or other non-tobacco products or a combination, such as a blended mix, which may or may not contain nicotine.

SUMMARY

According to an aspect there is provided an apparatus arranged to heat aerosolizable material to volatilize at least one component of the aerosolizable material, the apparatus comprising:

- a conductive coil defining an elongate receiving portion arranged to receive a consumable article comprising aerosolizable material, the conductive coil comprising a first end and a second end opposite the opposite the first end; and
- a clamping structure comprising a first engagement portion arranged to apply a first force to the first end and a second engagement portion arranged to apply a second force, opposing the first force, to the second end, thereby providing a tension in the conductive coil.

In an exemplary embodiment, the clamping structure comprises a first clamping element and a second clamping element arranged to be fitted to the first clamping element such that the first and second clamping elements encase the conductive coil.

In an exemplary embodiment, one of the first and second clamping elements comprises the first and second engagement portions.

In an exemplary embodiment, an edge of the first clamping element comprises a first profile and an edge of the second clamping element comprises a second profile arranged to conform with the first profile to align the second clamping element with the first clamping element.

In an exemplary embodiment, the clamping structure is formed of zirconia.

In an exemplary embodiment, the apparatus comprises a thermocouple arranged contact the conductive coil.

In an exemplary embodiment, the clamping structure comprises a thermocouple support arranged to clamp the thermocouple to the conductive coil.

In an exemplary embodiment, the clamping structure comprises one or more thermocouple apertures through which thermocouple wires can be routed between an interior of the clamping structure and an exterior of the clamping structure.

In an exemplary embodiment, the apparatus comprises a first power wire electrically connected to the first end of the conductive coil and a second power wire electrically connected to the second end of the conductive coil.

In an exemplary embodiment, the first and second power wires are electrically connected to the respective first and second ends of the conductive coil by a crimp joint or a solder joint.

In an exemplary embodiment, the conductive coil comprises a tab at each of the first and second ends; and the first and second engagement portions each comprise a hole or recess in which the respective tabs are located, wherein the tabs extend from an interior of the clamping structure to an exterior of the clamping structure to engage an edge of the respective hole or recess.

In an exemplary embodiment, the apparatus comprises a first conductive coil arranged to heat a first heating zone of the receiving portion and a second conductive coil arranged to heat a second zone of the receiving portion different to the first heating zone.

In an exemplary embodiment, the first and second engagement portions are arranged to provide a tension in the first conductive coil; and the clamping structure comprises a third engagement portion arranged to apply a third force to a first end of the second conductive coil and a fourth engagement portion arranged to apply a fourth force, opposing the third force, to a second end of the second conductive coil, thereby providing a tension in the second conductive coil.

In an exemplary embodiment, the first heating zone extends from a distal end of the receiving portion to a boundary point along the receiving portion, and the second heating zone extends from the boundary point to a proximal end of the receiving portion.

In an exemplary embodiment, he first heating zone extends by a length in the range 10 to 15 mm.

In an exemplary embodiment, the second heating zone extends by a length in the range 25 to 30 mm.

In an exemplary embodiment, the first power wire is electrically connected to the first end of the first conductive coil and the second power wire electrically is connected to the second end of the first conductive coil, and the apparatus comprises:

- a third power wire electrically connected to the first end of the second conductive coil;
- a fourth power wire electrically connected to the second end of the second conductive coil,
- wherein the first and second power wires are arranged to provide electric current to the first conductive coil and the third and fourth power wires are arranged to provide electric current to the second conductive coil.

In an exemplary embodiment, the first conductive coil is formed of wire having a first width and the second conductive coil is formed of a wire having a second width different to the first width.

In an exemplary embodiment, the wire is substantially rectangular in cross-section.

In an exemplary embodiment, the first conductive coil is formed of wire having a thickness in the range 0.1 mm±30% and a width in the range 2.75 mm±30%, and the second conductive coil is formed of wire having a thickness in the range 0.05 mm±30% and a width in the range 5.95 mm±30%.

In an exemplary embodiment, the first and second conductive coils comprise an equal number of turns.

In an exemplary embodiment, the receiving portion comprises a tube arranged to receive a cylindrical consumable article comprising aerosolizable material.

In an exemplary embodiment, each of the first and second clamping elements comprises one or more alignment protrusions arranged to engage with the tube to center the tube within the clamping structure.

In an exemplary embodiment, the conductive coil is arranged in a helix around the tube.

In an exemplary embodiment, the tube comprises a metal material such as aluminum.

In an exemplary embodiment, the apparatus comprises a layer of dielectric material disposed between the tube and the conductive coil.

In an exemplary embodiment, the apparatus comprises:

a cleanout tube arranged to provide an air path into the receiving portion; and an expansion chamber arranged to provide access for receiving a consumable article in the receiving portion and to provide an air path out of the receiving portion, wherein the cleanout tube and the expansion chamber are each arranged to receive an end of the clamping structure to hold the first clamping element in contact with the second clamping element to clamp the conductive coil to the receiving portion.

In an exemplary embodiment, the apparatus comprising:

a sleeve arranged to contain the clamping structure and the conductive coil;

a first sealing component arranged to form an air seal between the sleeve and the cleanout tube; and a second sealing component arranged to form an air seal between the sleeve and the expansion chamber.

In an exemplary embodiment, the cleanout tube and/or the expansion chamber is formed of zirconia.

In an exemplary embodiment, he expansion chamber is arranged to enable aerosol formed in the receiving portion to expand and cool.

In an exemplary embodiment, the cleanout tube comprises a channel and wherein one or more of the first, second, third and fourth power wires is routed through the channel.

In an exemplary embodiment, he clamping structure comprises an indention arranged to provide access to the channel.

In an exemplary embodiment, the channel comprising a sealing component is arranged to provide a seal around the first, second, third and fourth power wires.

In an exemplary embodiment, the conductive coil comprises one or more of: aluminum, managing, copper, steel, constantan, nickel, nichrome, stainless steel, and silver.

According to an aspect there is provided a method of manufacturing an apparatus arranged to heat aerosolizable material, the method comprising:

forming a conductive coil around an elongate receiving portion arranged to receive a consumable article comprising aerosolizable material, the conductive coil comprising a first end and a second end opposite the opposite the first end; and applying a clamping structure to the conductive coil, the clamping structure comprising a first engagement portion arranged to apply a first force to the first end and a second engagement portion arranged to apply a second force, opposing the first force, to the second end, to provide a tension in the conductive coil.

BRIEF DESCRIPTION OF THE DRAWINGS

Various embodiments will now be described, by way of example only, with reference to the accompanying drawings, in which.

DETAILED DESCRIPTION OF THE DRAWINGS

Apparatus is known that heats aerosolizable material to volatilize at least one component of the aerosolizable material, typically to form an aerosol which can be inhaled, without burning or combusting the aerosolizable material. Such apparatus is sometimes described as a “heat-not-burn” apparatus or a “tobacco heating product” or “tobacco heating device” or similar. Similarly, there are also so-called e-cigarette devices, which typically vaporize an aerosolizable material in the form of a liquid, which may or may not contain nicotine. In general, the aerosolizable material may be in the form of or provided as part of a rod, cartridge or cassette or the like which can be inserted into the apparatus. A heating material for heating and volatilizing the aerosolizable material may be provided as a “permanent” part of the apparatus or may be provided as part of the consumable article which is discarded and replaced after use. A “consumable article” in this context is a device or article or other component that includes or contains in use the aerosolizable material, which in use is heated to volatilize the aerosolizable material.

As used herein, the term “aerosolizable material” includes materials that provide volatilized components upon heating, typically in the form of vapor or an aerosol. “Aerosolizable material” may be a non-tobacco-containing material or a tobacco-containing material. “Aerosolizable material” may, for example, include one or more of tobacco per se, tobacco derivatives, expanded tobacco, reconstituted tobacco, tobacco extract, homogenized tobacco or tobacco substitutes. The aerosolizable material can be in the form of ground tobacco, cut rag tobacco, extruded tobacco, reconstituted tobacco, reconstituted aerosolizable material, liquid, gel, gelled sheet, powder, or agglomerates, or the like. “Aerosolizable material” also may include other, non-tobacco products, which, depending on the product, may or may not contain nicotine. "Aerosolizable material" may comprise one or more humectants, such as glycerol or propylene glycol.

Figure 1:
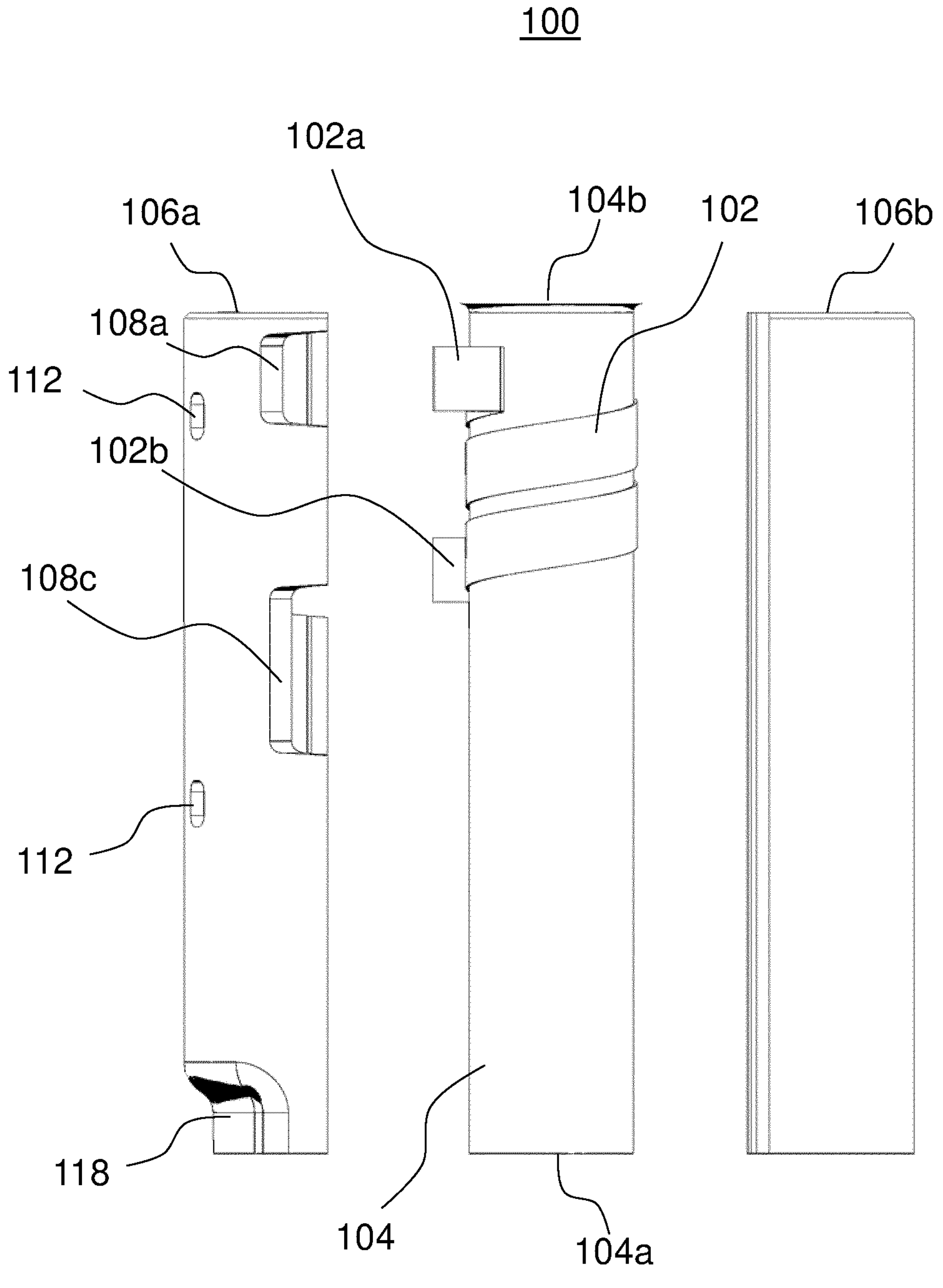
FIG. 1 is an exploded side view of an example of apparatus.

Referring to FIG. 1 there is shown an exploded side projection of an example of apparatus 100 according to an embodiment of the invention. The apparatus 100 is for heating aerosolizable material to volatilize at least one component of the aerosolizable material. For example, the apparatus 100 may be a heating apparatus that forms part of a heat-not-burn or tobacco heating product, such as those described above, or that forms part of an electronic cigarette.

The apparatus 100 comprises a conductive coil (referred to hereinafter as the coil 102) defining an elongate receiving portion arranged to receive a consumable article comprising aerosolizable material. In the example shown in FIG. 1 the receiving portion comprises a heat tube 104, which may be a metallic tube. For example, the heat tube 104 may be made of aluminum, copper, or another suitably conductive material.

The heat tube 104 has a first end 104*a* (which may be referred to as a distal end) and a second end 104*b* (which may be referred to as a proximal end). In use air may be received into the heat tube 104 at the first end 104*a* and heated air and volatized components of the aerosolizable material may leave the heat tube at the second end 104*b*. A consumable article may be inserted into the interior of the heat tube 104 via the second end 104*b*. As shown in FIG. 1, the second end 104*b* may comprise a flare or taper to aid insertion of a consumable article.

The external surface of the heat tube 104 may be oxidized, coated or otherwise provided with a layer dielectric material to electrically insulate the coil 102 from the heat tube 104 to prevent a short circuit that bypasses the coil 102.

The heat tube 104 may have a wall thickness in the range 0.05 to 0.15 mm. For example, the heat tube 104 may have a wall thickness of approximately 0.1 mm. In some examples, the wall thickness of the heat tube 104 may be substantially uniform along the length of the heat tube 104, so that the heat tube 104 absorbs heat energy substantially uniformly along its length. In other examples, the wall thickness of the heat tube 104 may vary along the length of the heat tube 104, or the heat tube 104 may comprise two or more heat tube segments having different wall thicknesses, providing different heat absorption characteristics for different parts of the heat tube 104.

The coil 102 comprises a first end 102*a* and a second end 102*b* and is wrapped in a helical arrangement around the heat tube 104. In the example shown in FIG. 1, the coil 102 has two and a half turns and comprises a tab at each of the first and second ends 102*a*, 102*b*, which provide space on which to form an electrical connection (for example, via a crimp joint or solder joint) with a power source, as described below. The coil 102 acts as a resistive heater when electric current from the power source flows from the first end 102*a* to the second end 102*b*, or vice versa. The coil 102 may be made from one or more of: Fecralloy®, aluminum, manganin, copper, steel, constantan, nickel, nichrome, stainless steel, and silver. The coil 102 may be formed of wire having a substantially rectangular cross-section.

The apparatus 100 also comprises a clamping structure 106. In the embodiment shown in FIG. 1, the clamping structure comprises a first clamping element 106*a* and a second clamping element 106*b*. The second clamping element 106*b* is arranged to be fitted to the first clamping element 106*a* such that the first and second clamping elements 106*a*, 106*b* encase the coil 102. The clamping structure 106 may be made from a ceramic material suitable for withstanding high temperatures. The clamping structure 106 may be manufactured by molding a material to the desired shape. For example, the clamping structure 106 may be molded from zirconia (zirconium dioxide) or other ceramic materials that have low thermal conductivity, thereby reducing heat loss from the apparatus 100. Alternatively, the clamping structure 106 may be manufactured by machining a material to a desired shape or may be manufactured using an additive manufacturing technique. In other examples, the clamping structure 106 may be formed of a polymer having a low thermal conductivity and high melting point, such as polyether ether ketone (PEEK).

Figure 2:
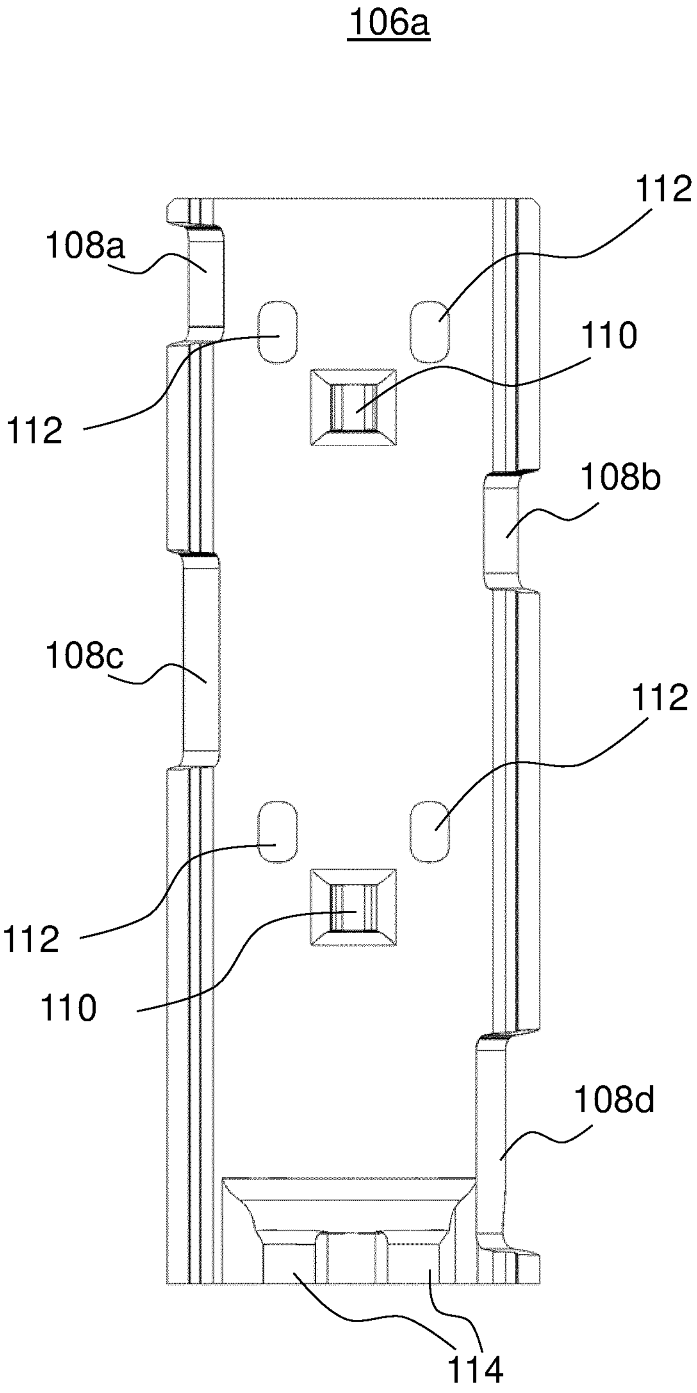
FIG. 2 is a side view of an example of a first clamping element.

FIG. 2 is a side projection of an example of a first clamping element 106*a* of the clamping structure 106, showing features on an interior surface of the first clamping element 106*a*. The first clamping element 106*a* comprises a first engagement portion 108*a* and a second engagement portion 108*b*. The first and second engagement portion 108*a*, 108*b* are arranged to engage with ends of the coil 102 to tighten the coil around the heat tube 104. In particular, when the clamping structure 106 is assembled (as described below with reference to FIGS. 5, 6*a* and 6*b*), the first engagement portion 108*a* applies a force to the first end 102*a* of the coil 102 and the second engagement portion 108*b* applies an opposing force to the second end 102*b* of the coil 102. The resulting opposing forces act, in a manner similar to the action of a torsion spring, to provide a tension in the coil 102. The tension in the coil 102 tightens the coil 102 against the external surface of the heat tube 104, which may improve transfer (e.g. by conduction and/or radiation) of heat energy generated by the coil 102 to the heat tube 104, thereby improving the efficiency of the apparatus 100 and/or reducing the time taken for the heat tube 104 to reach a desired temperature suitable for volatizing components of aerosolizable material.

In the example shown in FIG. 2, the engagement portions 108*a*, 108*b* each comprise a hole or recess. The tabs at the first and second ends 102*a*, 102*b* of the coil 102 extend through one of the holes or recesses so that they extend from an interior of the clamping structure 106 to an exterior of the clamping structure 106. Accordingly, the holes or recesses provide a path through which conductors carrying electric power can be routed to provide an electric current to the coil 102 causing the coil to generate heat. Each tab engages an edge of a respective hole or recess of an engagement portion 108*a*, 108*b* so that the engagement portion 108*a*, 108*b* can exert a force on the tabs to provide a tension in the coil 102 as described above. In particular, the depth of the recesses of the engagement portions 108*a*, 108*b* and/or positions of the tabs at the first and second ends 102*a*, 102*b* of the coil 102 may be selected such that the circumferential separation between the tabs is smaller than the circumferential separation between the engagement portions 108*a*, 108*b*, such that when the clamping structure 106 is applied to the apparatus 100, the engagement portions 108*a*, 108*b* come into contact with the tabs before the clamping structure 106 is full applied, and pull the tabs when the clamping structure 106 is fully applied.

In some embodiments, the apparatus 100 comprises one or more thermocouples (not shown) arranged contact the coil 102 to provide a signal indicative of the temperature of the coil. In the example shown in FIG. 2, the first clamping element 106*a* of the clamping structure 106 comprises a thermocouple support 110 arranged to support the thermocouple. In particular, the thermocouple support 110 is positioned to clamp the thermocouple to an appropriate position on the coil 102 and to provide a clamping force to maintain contact between the thermocouple and the coil 102 to provide accurate measurements of the temperature of the coil 102.

In order that the thermocouple can provide signals indicative of the temperature of the coil 102 to control electronics (not shown), the first clamping element 102*a* of the clamping structure 102 comprises one or more thermocouple wire apertures 112 through which thermocouple wires can be routed from an interior of the clamping structure (i.e. where the thermocouple is in contact with the coil 102) to an exterior of the clamping structure (i.e. to the control electronics). In some examples, as shown in FIG. 2, a thermocouple wire aperture 112 is provided for each thermocouple wire, which may provide improved stability and positional accuracy of the thermocouple over examples in which more than one thermocouple wire is routed through a given aperture.

Figure 3:
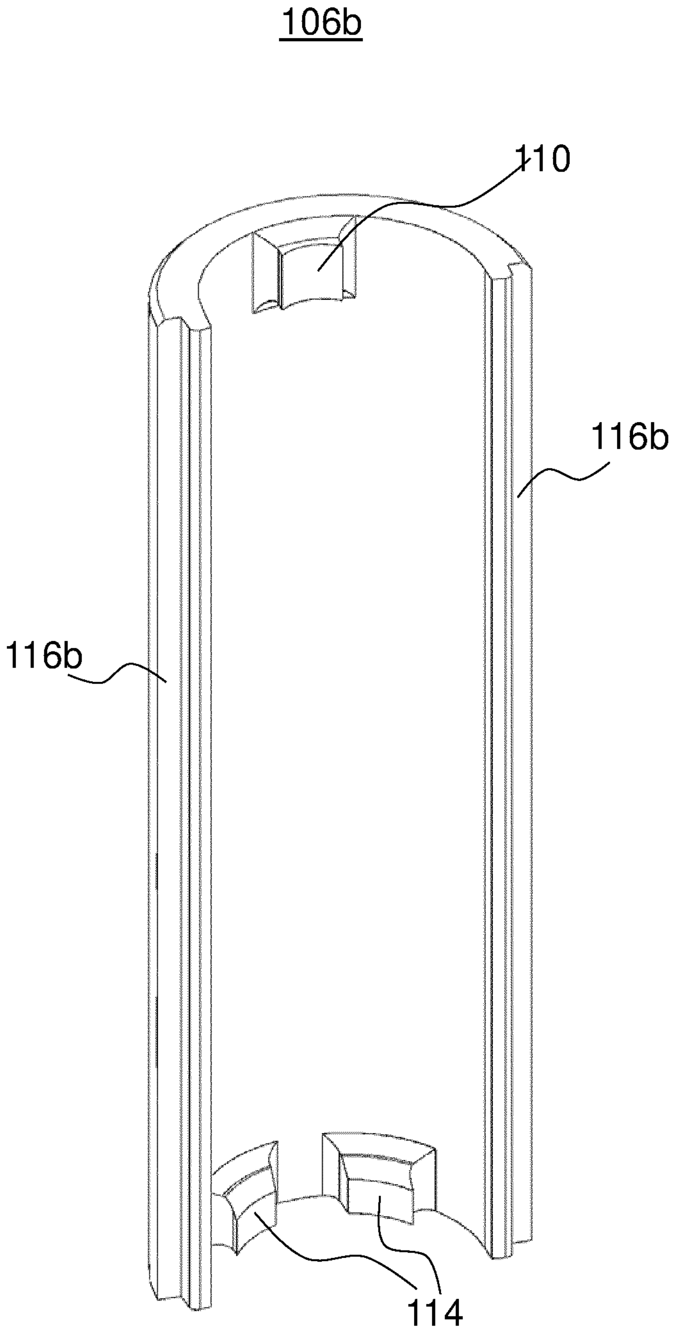
FIG. 3 is a perspective view of an example of a second clamping element.

FIG. 3 is a side projection of an example of a second clamping element 106*b* of the clamping structure 106, showing features on an interior surface of the second clamping element 106*b*. In the example shown in FIG. 3, alignment protrusions referred to herein as support elements 114 are provided on the internal surface of the first clamping element 106*a*. Corresponding support elements 114 are provided on the internal surface of the second clamping element 106*b*, as shown in FIG. 2. These support elements 114 help to ensure that the heat tube 104 is concentric within the clamping structure 106 when the apparatus 100 is assembled, and therefore centralized within the apparatus 100. Furthermore, limiting contact between the clamping structure 106 and the heat tube 104 to the support elements 114 and the thermocouple support 110 may reduce thermal transfer and therefore increase the efficiency of the apparatus.

Figure 4:
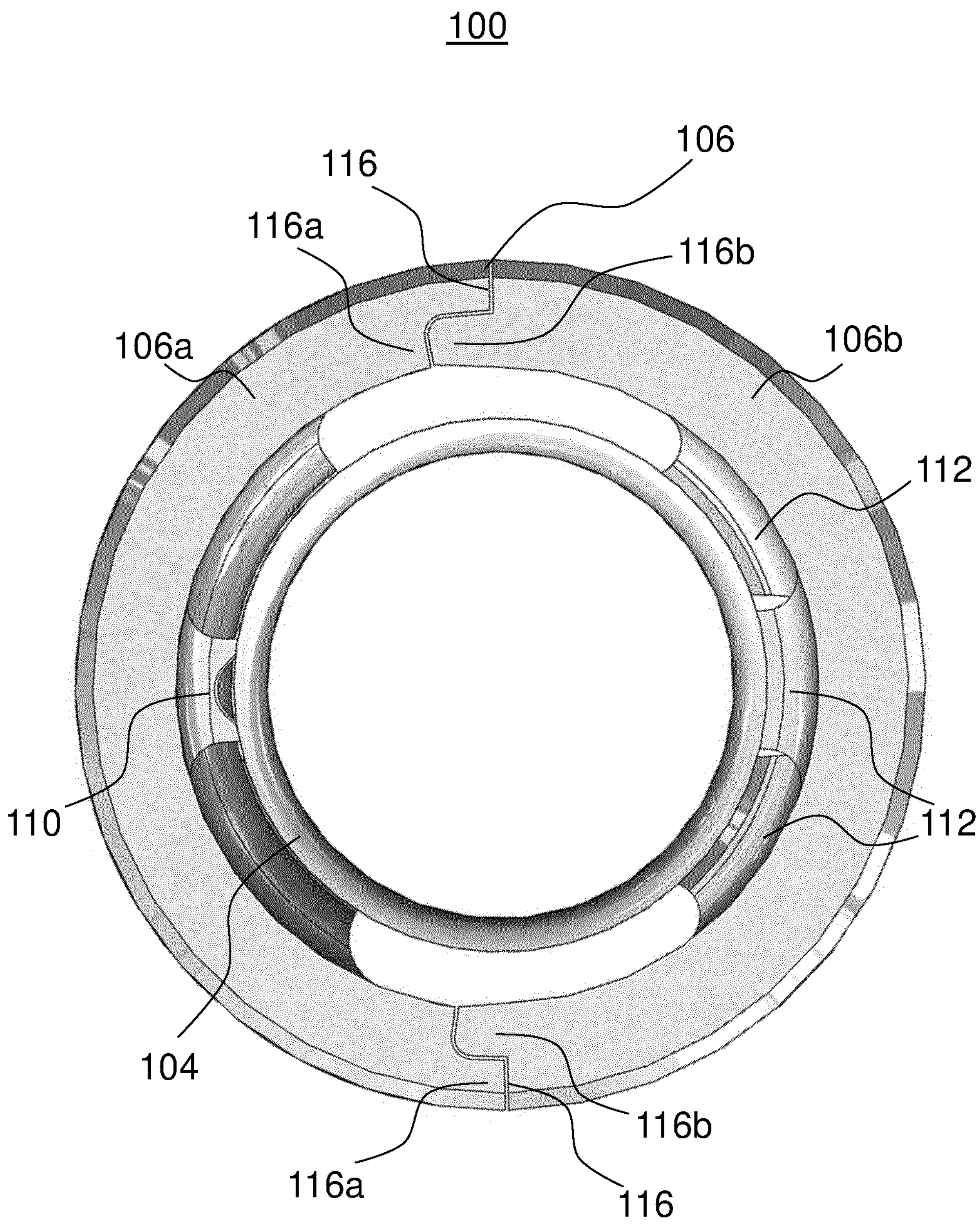
FIG. 4 is a plan view of an example of an apparatus.

FIG. 4 is a plan view of the apparatus 100 shown in FIG. 1 when assembled. As shown in FIG. 4, edges of the first and second clamping portions 106*a*, 106*b* are provided with features for providing a joint 116 for aligning the first clamping element 106*a* with the second clamping element 106*b*. In particular, edges of the first clamping element 106*a* comprise a first profile 116*a* and edges of the second clamping element 106*b* comprise a second profile 116*b* arranged to conform with (i.e. correspond to a matching shape) the first profile 116*a* to align the second clamping element 106*b* with the first clamping element 106*a*.

Although in the example described above the engagement portions 108*a*, 108*b*, 108*c*, 108*d* are described as being formed in the first clamping element 106*a*, in other embodiments, the engagement portions 108*a*, 108*b*, 108*c*, 108*d* may be formed in the second clamping element 106*b*. Alternatively, some of the engagement portions 108*a*, 108*b*, 108*c*, 108*d* may be formed in the first clamping element 106*a* and others engagement portions 108*a*, 108*b*, 108*c*, 108*d* may be formed in the second engagement portion 106*b*. Furthermore, although the clamping structure 106 described above comprises two clamping elements, in some embodiments, the clamping structure may comprise a single clamping element or may comprise more than two clamping elements.

Figure 5:
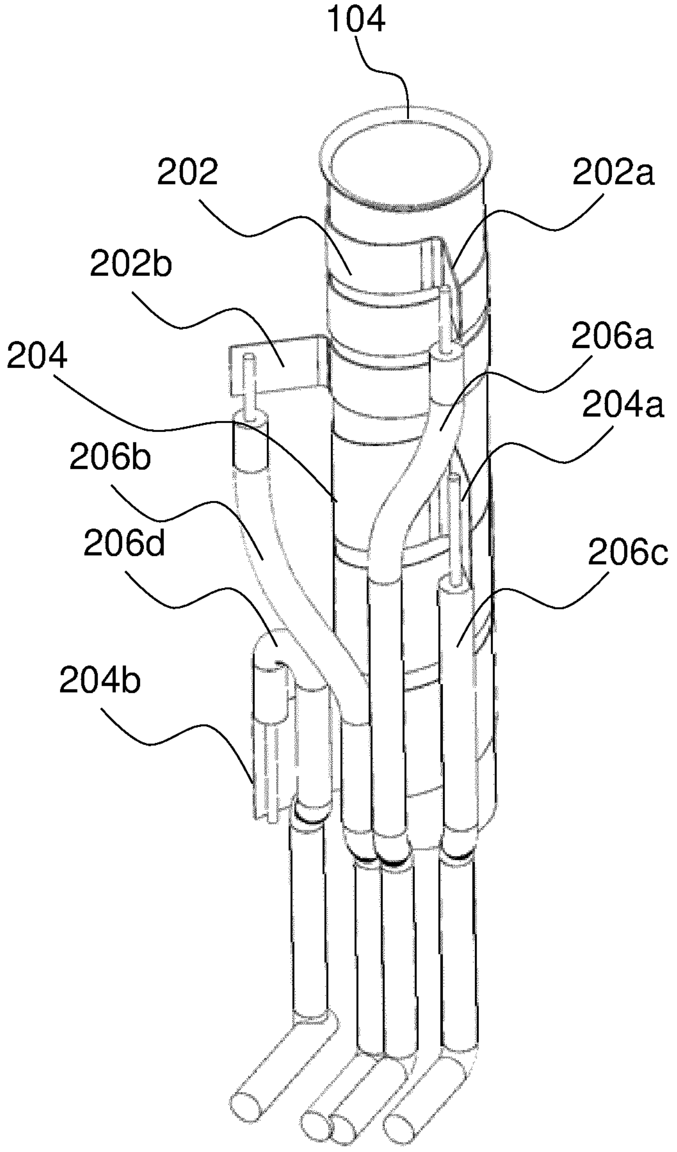
FIG. 5 is a perspective view of an example of an apparatus.

FIG. 5 is a perspective view of another example of apparatus 200 according to an embodiment of the invention. The apparatus shown in FIG. 2 is similar to the apparatus shown in FIG. 1 but includes multiple coils; in this example a first coil 202 and a second coil 204.

The first coil 202 has a first end 202*a* and a second end 202*b* that are electrically connected (e.g. by a crimp joint or solder joint) to a first power wire 206*a* and a second power wire 206*b* respectively. Similarly, the second coil 204 has a first end 204*a* and a second end 204*b* that are electrically connected (e.g. by a crimp joint or solder joint) to a first power wire 206*c* and a second power wire 206*d* respectively. Each of the first and second coils 202, 204 are wrapped in a helical arrangement around the heat tube 104. Each of the power wires 206*a*-206*d* may comprise a conductive core covered with an electrically insulating sheath. In some examples the insulating sheath may be formed from polyether ether ketone (PEEK).

In other examples, the power wires 206*a*-206*d* may be shortened or omitted and the first and second coils 202, 204 may be connected directly (or via shorter wires) to control circuitry located close to the external surface of the clamping structure 106.

In use the first coil 202 is arranged to heat a first heating zone of the heat tube 104 and the second coil 204 is arranged to heat a second zone of the heat tube. The first heating zone may extend from a distal end of the heat tube 104 (i.e. the first end 104*a*) to a boundary point along the heat tube 104, and the second heating zone may extend from the boundary point to a proximal end of the of the heat tube 104 (i.e. the second end 104*b*). In some examples, the first heating zone extends by a length in the range 10 to 15 mm. In some examples, the second heating zone extends by a length in the range 20 to 30 mm.

As with the example described above with reference to FIG. 1, the ends of the first and second coils comprise tabs that provide space on which to form an electrical connection (for example, via a crimp joint or solder joint) with a power source via power wires 206*a*-206*d*. The tabs extend through one of the holes or recesses so that they extend from an interior of the clamping structure 106 to an exterior of the clamping structure 106. As shown in FIGS. 1 and 2, the clamping structure includes third and fourth engagement portions 108*c*, 108*d* that the tabs in the manner described above with reference to the first and second engagement portions 108*a*, 108*b* of the clamping structure 106.

In use, the rate at which the temperature of the first coil 202 or the second coil 204 increases depends upon the power applied to the first coil 202 or the second coil 204 and the resistance of the first coil 202 or the second coil 204. In embodiments in which an electrical power source (not shown) is a rechargeable battery, the voltage provided by the battery is typically a minimum of approximately 2.7 Volts, but may be up to a voltage of 4.2 Volts, and can deliver and electrical current of up to a maximum of approximately 8.6 Amps. Accordingly, the maximum power that can be supplied by such a rechargeable battery is typically approximately 23 Watts. Therefore, a target resistance for the first coil 202 or the second coil 204 when powered by such a rechargeable battery may be approximately 0.32 Ohms (0.35 Ohms±5%). Such a resistance enables the temperature of the first coil 202 or the second coil 204 to increase from room temperature (i.e. approximately 23° C.) to a target temperature of approximately 280° C. in approximately three seconds (the 'ramp up' time); i.e. at a rate of approximately 90° C. per second, which is comparable with heating rates of inductive wires arranged to heat consumable article comprising aerosolizable material.

The resistance of the first coil 202 or the second coil 204 is dependent on the resistivity of the coil material. Lower density materials have a lower mass and therefore require less energy and/or time to heat. Similarly, materials having a lower specific heat require less energy and/or time to heat.

However, since density is inversely proportional to specific heat, both cannot be selected to be low and a balance must be found.

Regarding resistivity of the material, a balance must be found between the energy and/or time required to heat and the coverage of a surface that is to be heated. Higher resistivity materials require less material and therefore have a lower mass (and therefore require less energy and/or time to heat) but cover less of the surface to be heated, whereas lower resistivity materials require more material and therefore have a higher mass (and therefore require more energy and/or time to heat) but cover more of the surface to be heated.

With a target temperature rise of approximately 257° C., a maximum available power of approximately 23 Watts, the time taken to reach the desired temperature for a given volume of material, $t_v$ (having units of s/mm$^3$), can be calculated for different materials using the equation:

$$t_v=(\text{Temperature Rise}\times\text{Specific Heat}\times\text{Density})/\text{Power}$$

In some examples, in use, the apparatus 200 is configured so that the first coil 202 heats the first heating zone to a first zone target temperature and the second coil 204 heats the second heating zone to a second zone target temperature. The first heating zone target temperature may be in the range of between about 240° C. and about 300° C., such as between about 250° C. and about 280° C. Likewise, the second heating zone target temperature may also be in the range of between about 240° C. and about 300° C., such as between about 250° C. and about 280° C.

In some examples, in use, the apparatus 200 is configured so that the first coil 202 heats the first heating zone to the first heating zone target temperature in a ramp up time of between 2 to 40 seconds, such as between 2 to 10 seconds, for example 2 to 5 seconds. Likewise, in use, the apparatus 200 is configured so that the second coil 204 heats the second heating zone to the second heating zone target temperature in a ramp up time of between 2 to 40 seconds, such as between 2 to 10 seconds, for example 2 to 5 seconds.

Figure 6A:
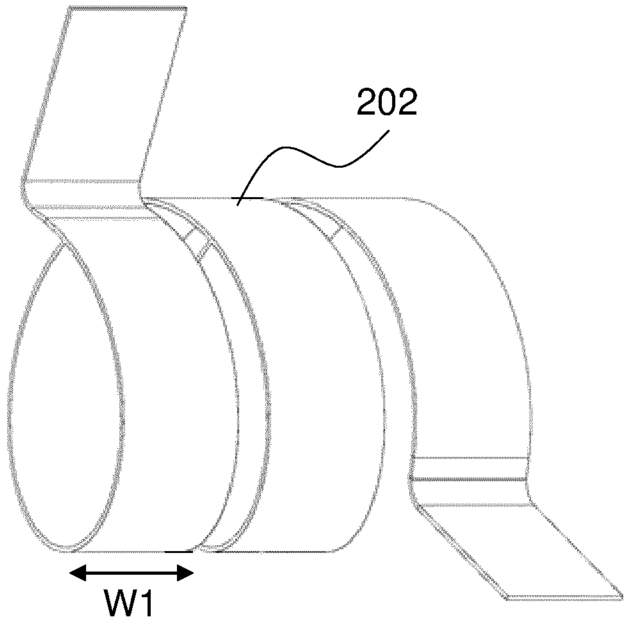
FIG. 6*a* is a perspective view of an example of a first coil and FIG. 6*b* is a perspective view of an example of a second coil.
Figure 6B:
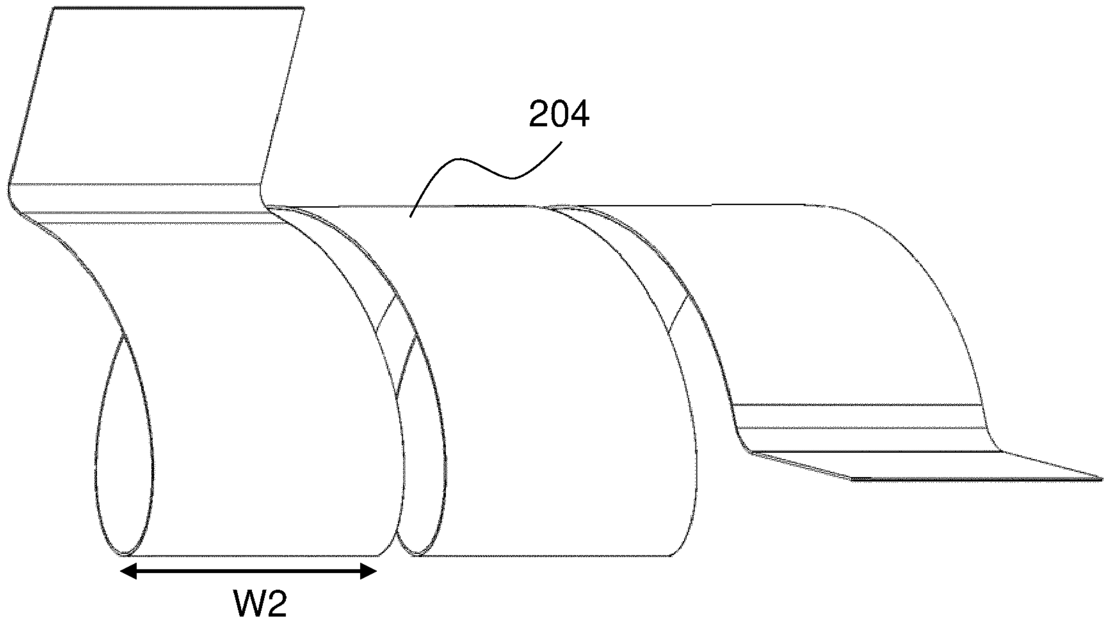

FIG. 6*a* shows a perspective view of the first coil 202 and FIG. 6*b* shows a perspective view of the second coil 204.

Each of the first and second coils 202, 204 acts as a resistive heater when electric current from the power source flows from the first end 202*a*, 204*a* to the second end 202*b*, 204*b* or vice versa. The first and second coils 202, 204 may be made from one or more of: Fecralloy®, aluminum, manganin, copper, steel, constantan, nickel, nichrome, stainless steel, and silver. The first coil 202 may have different dimensions to the second coil 204. The first and second coils 202, 204 may be formed of wire having a substantially rectangular cross-section.

The first coil 202 and the second coil 204 may have the same number of turns or a different number of turns. In the example shown in FIGS. 6*a* and 6*b*, the first coil 202 and the second coil 204 each have approximately two and a half turns and each comprise tabs at each of the first and second ends 202*a*, 202*b*, 204*a*, 204*b*, which provide space on which to form an electrical connection (for example, via a crimp joint or solder joint) with a power source. The first and second coils 202, 204 are each formed of wire having a substantially rectangular cross section. The first coil 202 may be formed of wire having a thickness in the range 0.1 mm±30%, a width W1 in the range 2.75 mm±30% a length of approximately 62.36 mm±30%, providing approximately 10.7 mm$^2$ of area in contact with the heat tube 104 and a resistance of approximately 0.37Ω. The second coil 204 may be formed of wire having a thickness in the range 0.05 mm 30%, a width W2 in the range 5.95 mm±30% and a length in the range 62 mm±30%, providing approximately 21.7 mm$^2$ of area in contact with the heat tube 104 and a resistance of approximately 0.36Ω.

The apparatus 100, 200 described above, provides a resistive heating arrangement that has heating characteristics that are similar in performance to inductive heating arrangements, but are cheaper and/or easier to manufacture. For example, the apparatus 100, 200 may heat the heat tube 104 so that the temperature of the heat tube 104 (or a given zone of the heat tube 104) ramps up from room temperature to 250° C. (i.e. a temperature high enough to aerosolize the aerosolizable material sufficient to provide a good first puff) in less than 20 seconds, such as in the range 14 seconds to 20 seconds, and provide approximately 4 to 10 back-to-back sessions.

Furthermore, such a heating arrangement may enable a smaller apparatus and therefore may enable the apparatus to be modified to accommodate larger format consumable articles without necessarily increasing the overall dimensions of the device. For example, the apparatus (i.e. the heat tube and coils) may be modified to accommodate a so-called demi-slim format consumable article.

Figure 7A:
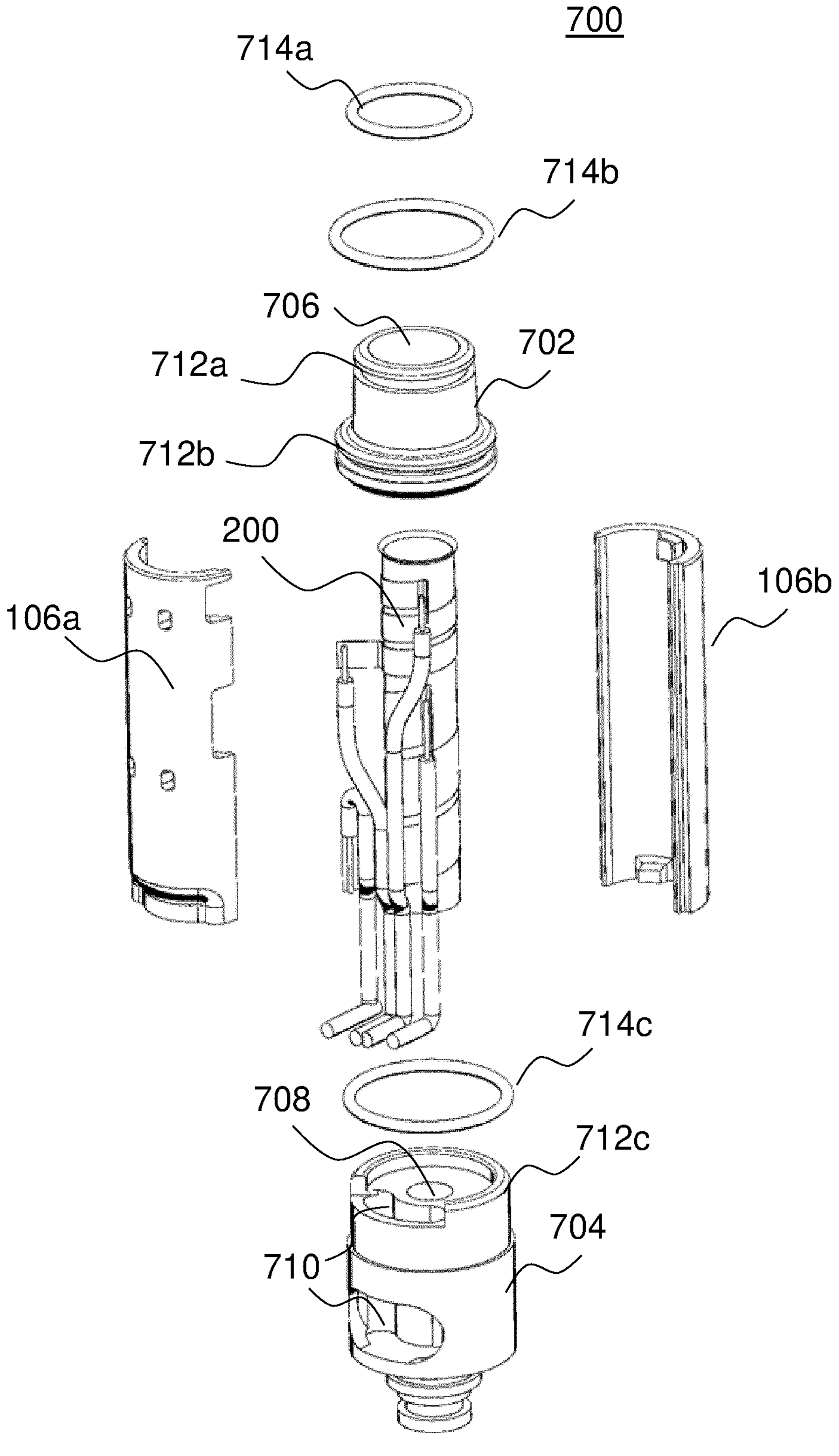
FIG. 7*a* is an exploded perspective view of an example of a device comprising an example of an apparatus and FIG. 7*b* is a perspective view of an example of a device comprising an example of an apparatus.

The apparatus 100, 200 described above may be used in a device such a heat-not-burn or tobacco heating product. For example, FIG. 7*a* is an exploded view illustrating the assembly of such a device 700 including the apparatus 200 described above with reference to FIG. 5, and FIG. 7*b* is a perspective view of the same device 700 with the apparatus partially assembled. The device 700 comprises the apparatus 200, an expansion chamber 702 and a cleanout tube 704.

The expansion chamber 702 is a generally annular component having a through hole 706 passing through its center. The through hole 706 provides a path through which a consumable can be inserted into the heat tube 104. The through hole 706 also acts as an outlet to permit volatilized components of the aerosolizable material to pass from the heat tube 104 towards an exterior of the device 700 when the consumable article is heated in use. In some examples, the through hole 706 may have a larger diameter than the heat tube 104 and/or may taper to a larger diameter that the heat tube to allow gases heated by the apparatus 200 and containing volatized components from the aerosolizable material to expand and cool as they pass through the through hole 706.

The cleanout tube 704 is a generally tubular component having an inlet hole 708 that fluidly connects the interior of the heat tube 104 with the exterior of the device 700 and through which air may be drawn in when a user draws on the consumable. A user may be able to inhale the volatilized component(s) of the aerosolizable material by drawing the volatilized component(s) from the consumable article. As the volatilized component(s) are removed from the consumable article, air may be drawn into the heat tube 104 via the inlet hole 708. The inlet hole 708 may also provide access to the interior of the heating tube 104 for cleaning.

The cleanout tube 704 also includes a channel 710 for routing power wires such as the power wires 206*a*-206*d* described above with reference to FIG. 5.

The expansion chamber 702 and/or the cleanout tube 704 may be formed of zirconia or other ceramic materials that have low thermal conductivity, thereby reducing heat loss from the apparatus 200. In other examples, the expansion chamber 702 and/or the cleanout tube 704 may be formed of a polymer having a low thermal conductivity and high melting point, such as polyether ether ketone (PEEK). The expansion chamber 702 and/or the cleanout tube 704 may be manufactured by molding a material to the desired shape. For example, the expansion chamber 702 and/or the cleanout tube 704 may be molded. Alternatively, the expansion chamber 702 and/or the cleanout tube 704 may be manufactured by machining a material to a desired shape or may be manufactured using an additive manufacturing technique.

Figure 9A:
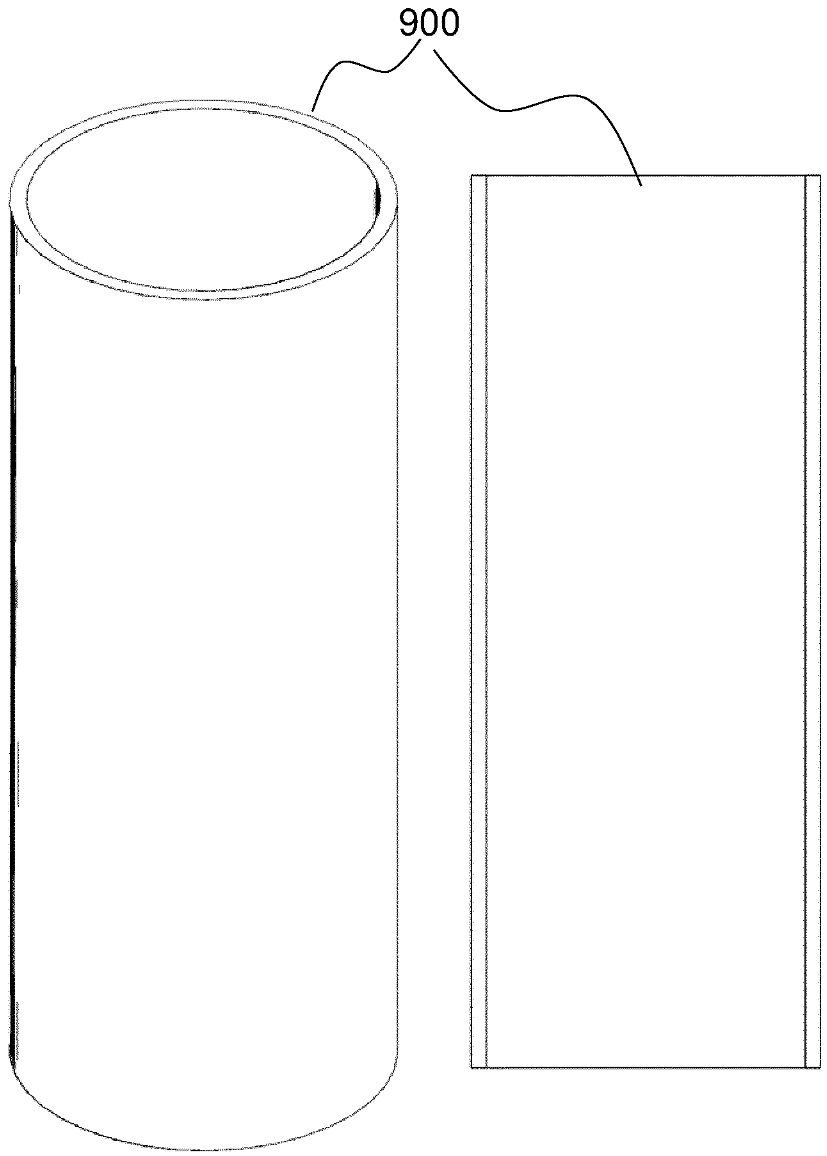
FIG. 9*a* shows perspective and cross-sectional views of an example of a sleeve and FIG. 9*b* shows perspective and cross-sectional views of an example of a sleeve.
Figure 9B:
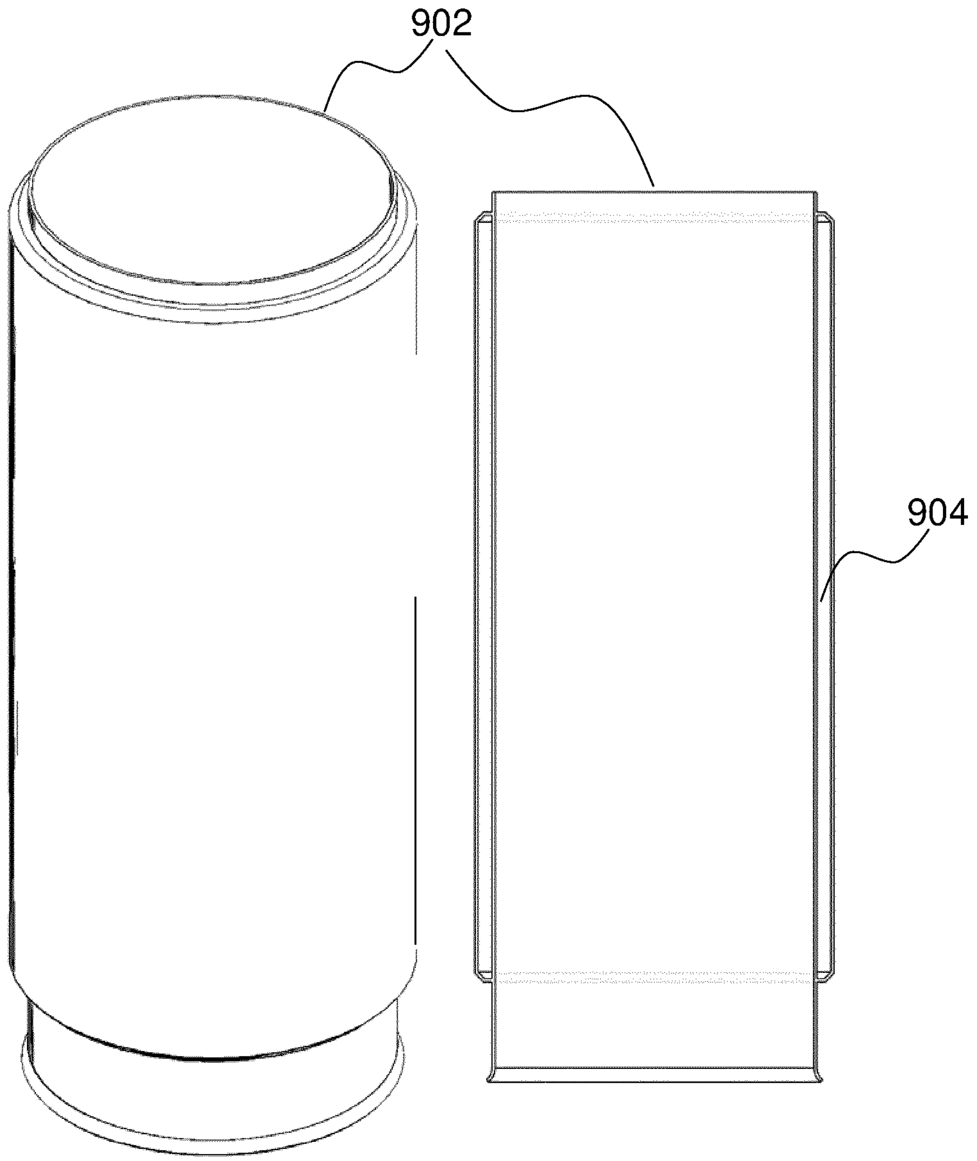

The expansion chamber 702 and the cleanout tube 704 may comprise indentations, such as grooves or recesses arranged to received seals for sealing the device 700 in a sleeve or housing (not shown but described below with reference to FIGS. 9*a* and 9*b*). For example, as shown in FIGS. 7*a* and 7*b*, the expansion chamber 702 comprises an upper groove 712*a* arranged to receive an upper expansion chamber O-ring 214*a* and a lower groove 712*b* arranged to receive a lower expansion chamber O-ring 714*b* and the cleanout tube 704 comprises a recess 712*c* arranged to receive a cleanout tube O-ring 714*c*.

Figure 7B:
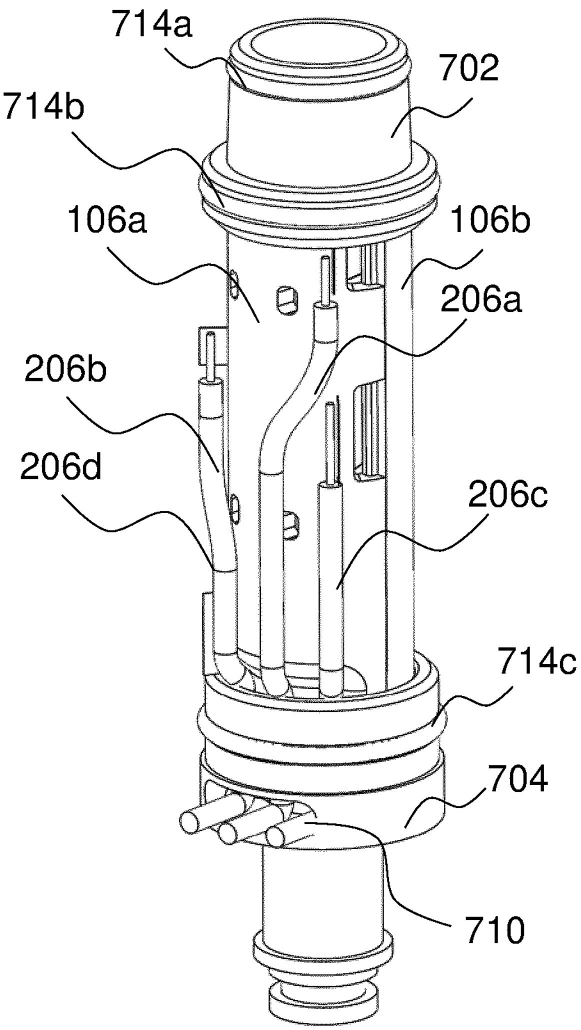

As most clearly seen in FIG. 7*b*, when assembled, the first and second clamping elements 106*a*, 106*b* of the clamping structure 106 are located in recesses in end portions the expansion chamber 702 and the cleanout tube 704. These recesses act to hold the first and second clamping elements 106*a*, 106*b* together (joined at the joint 116) so that the engagement portions 108*a*-108*d* engage the first and second ends 102*a*-102*d*, of the first and second coils 202, 204. The recesses also help to ensure that the clamping structure 106 is concentric in the apparatus 100, 200 when the apparatus 100, 200 is assembled.

The first, second, third and fourth power wires 206*a*-206*d* are electrically connected to the first and second ends 102*a*-102*d*, of the first and second coils 202, 204 (for example, via a crimp joint or solder joint) and extend along the exterior length of the clamping structure 106, and through the channel 710 provided in the cleanout tube 704 to be electrically connected to a power source and/or control circuit (not shown). During manufacture of the device 700, the channel 710 may be sealed to prevent ingress of air or moisture. For example, the channel 710 may be sealed with a sealing component arranged to provide a seal around the power wires 206*a*-206*d* or may be filled or partially filled with a sealing material, such as a rubberized material or a resin. In some examples, the thermocouple wires (not shown) may also be routed through the channel 710 in the same manner as the power wires.

As shown most clearly in FIGS. 1 and 7*b* the clamping structure 106 comprises an indention 118 arranged to provide access to the channel 710 so that the power wires and/or the thermocouple wires can be more easily routed through the channel 710. In the example shown, the indentation 118 is provided in the first clamping element 106*a* but in other examples the indentation may be provided in the second clamping element 106*b* or in another clamping element. Alternatively, the wires may be routed externally around the cleanout tube 704.

Figure 8:
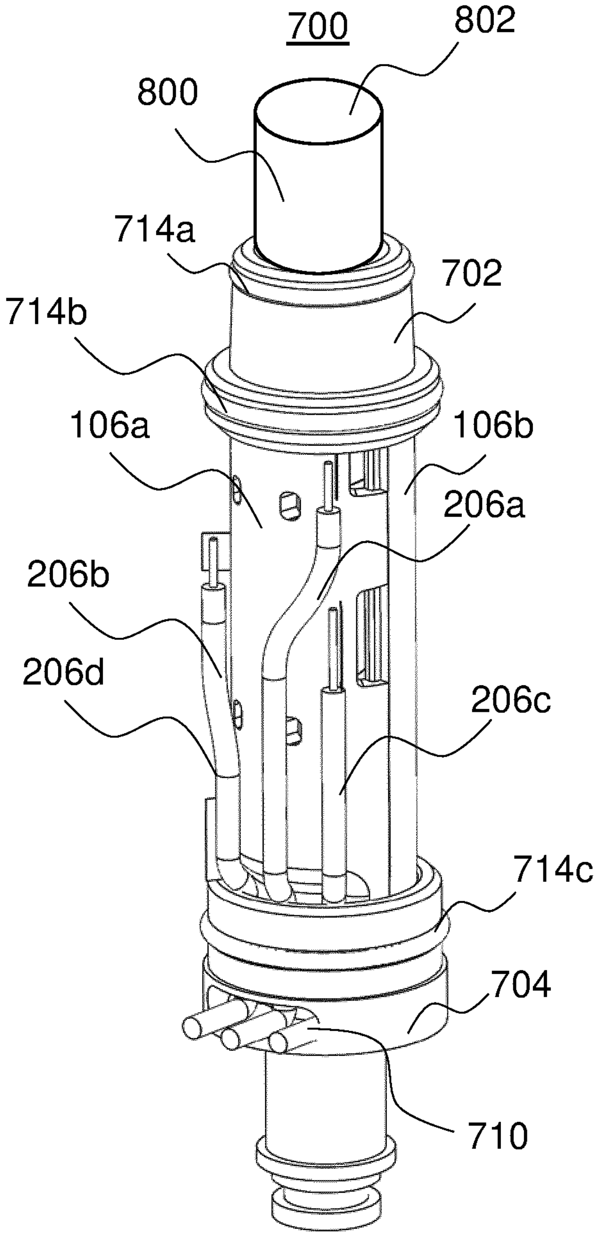
FIG. 8 is a perspective view of an example of a device with a consumable article inserted in the heat tube.

FIG. 8 shows device 700 comprising an apparatus 200, as described above with reference to FIG. 2, in use with a consumable article 800 inserted into the heat tube 104. As described above, the consumable article 800 may be inserted into the apparatus to be heated to release (i.e. volatize) components present in aerosolizable material present in the consumable article 800. An end 802 of the consumable article 800 may, in some embodiments act as a mouthpiece from which volatized components from the aerosolizable material may be drawn.

When a consumable article is present in the heat tube 104, and the controller of the device controls the electric power source to pass an electric current through the coil(s), heat from the coil(s) heats the aerosolizable material to volatize components of the aerosolizable material.

The device 700 described above with reference to FIGS. 7*a* and 7*b* may be contained within a sleeve arranged to form a seal with the lower expansion chamber O-ring 214*b* and the cleanout tube O-ring 214*c*. The sleeve provides a degree of thermal insulation between the apparatus 100, 200 and the external surface of the device 700. FIGS. 9*a* and 9*b* show examples of sleeves that may be used in the device 700. In the example shown in FIG. 9*a*, the sleeve 900 is a single-walled sleeve. In the example shown in FIG. 9*b*, the sleeve 902 is a double-walled sleeve in which there is a gap 904 comprising air, another gas, or a partial vacuum providing additional thermal insulation. In some examples, the additional thermal insulation provided by the sleeve 902 shown in FIG. 9*b* may be advantageous. However, in examples where additional thermal insulation is not required, the sleeve 900 shown in FIG. 9*a*, which may be simpler and cheaper to manufacture may be preferred.

Figure 10:
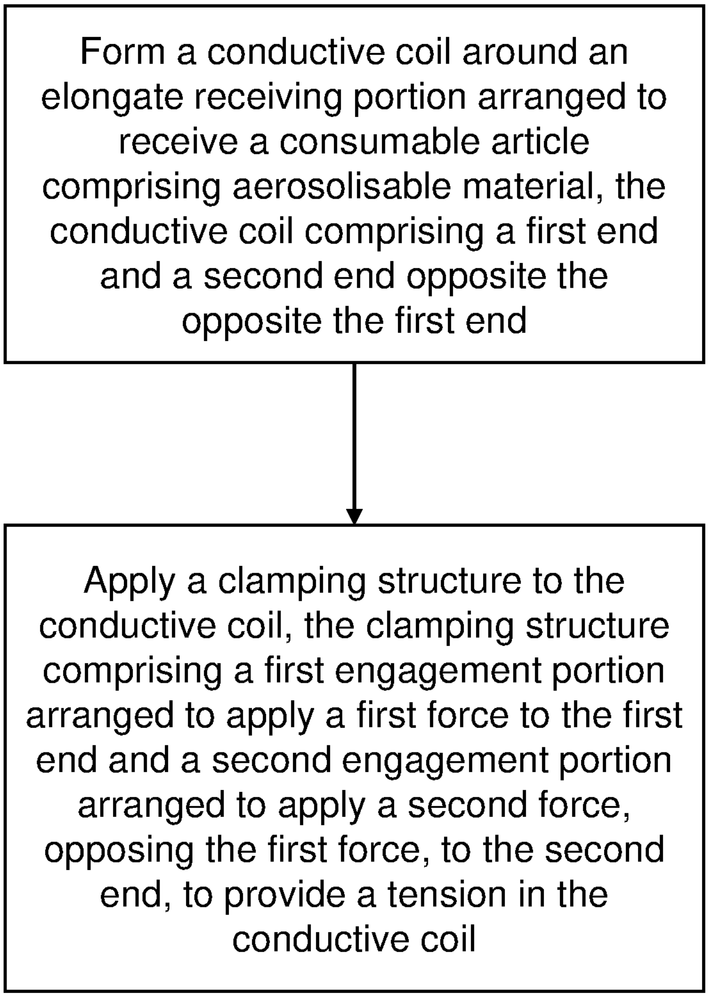
FIG. 10 is a simplified block diagram of an example of a method of manufacturing an apparatus.

FIG. 10 is a simplified block diagram illustrating a method 1000 of manufacturing an apparatus, such as the apparatus described above with reference to FIGS. 1 and 5.

At block 1002 a conductive coil is formed around an elongate receiving portion arranged to receive a consumable article comprising aerosolizable material. The conductive coil comprises a first end and a second end opposite the opposite the first end.

At block 1004 a clamping structure is applied to the conductive coil. The clamping structure comprises a first engagement portion arranged to apply a first force to the first end and a second engagement portion arranged to apply a second force, opposing the first force, to the second end, to provide a tension in the conductive coil.

The various embodiments described herein are presented only to assist in understanding and teaching the claimed features. These embodiments are provided as a representative sample of embodiments only and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An apparatus arranged to heat aerosolizable material to volatilize at least one component of the aerosolizable material, the apparatus comprising:

a conductive coil defining an elongate receiving portion arranged to receive a consumable article comprising aerosolizable material, the conductive coil comprising a first end and a second end opposite the first end; and a clamping structure comprising a first engagement portion arranged to apply a first force to the first end and a second engagement portion arranged to apply a second force, opposing the first force, to the second end, thereby providing a tension in the conductive coil.

2. An apparatus as claimed in claim 1, wherein the clamping structure comprises a first clamping element and a second clamping element arranged to be fitted to the first clamping element such that the first and second clamping elements encase the conductive coil.

3. An apparatus as claimed in claim 2, wherein one of the first and second clamping elements comprises the first and second engagement portions.

4. An apparatus as claimed in claim 2, wherein an edge of the first clamping element comprises a first profile and an edge of the second clamping element comprises a second profile arranged to conform with the first profile to align the second clamping element with the first clamping element.

5. An apparatus as claimed in claim 1, wherein the clamping structure is formed of zirconia.

6. An apparatus as claimed in claim 1, comprising a thermocouple arranged to contact the conductive coil.

7. An apparatus as claimed in claim 6, wherein the clamping structure comprises a thermocouple support arranged to clamp the thermocouple to the conductive coil.

8. An apparatus as claimed in claim 6, wherein the clamping structure comprises one or more thermocouple apertures through which thermocouple wires can be routed between an interior of the clamping structure and an exterior of the clamping structure.

9. An apparatus as claimed in claim 1, comprising a first power wire electrically connected to the first end of the conductive coil and a second power wire electrically connected to the second end of the conductive coil.

10. An apparatus as claimed in claim 9, wherein the first and second power wires are electrically connected to the respective first and second ends of the conductive coil by a crimp joint or a solder joint.

11. An apparatus as claimed in claim 1, wherein:

the conductive coil comprises a tab at each of the first and second ends; and the first and second engagement portions each comprise a hole or recess in which the respective tabs are located, wherein the tabs extend from an interior of the clamping structure to an exterior of the clamping structure to engage an edge of the respective hole or recess.

12. An apparatus as claimed in claim 1, wherein the conductive coil is a first conductive coil arranged to heat a first heating zone of the receiving portion, and apparatus further comprises a second conductive coil arranged to heat a second zone of the receiving portion different to the first heating zone.

13. An apparatus as claimed in claim 12, wherein the clamping structure comprises a third engagement portion arranged to apply a third force to a first end of the second conductive coil and a fourth engagement portion arranged to apply a fourth force, opposing the third force, to a second end of the second conductive coil, thereby providing a tension in the second conductive coil.

14. An apparatus as claimed in claim 12, wherein the first heating zone extends from a distal end of the receiving portion to a boundary point along the receiving portion, and the second heating zone extends from the boundary point to a proximal end of the receiving portion.

15. An apparatus as claimed in claim 12, wherein the first heating zone extends by a length in the range 10 to 15 mm.

16. An apparatus as claimed in claim 12, wherein the second heating zone extends by a length in the range 25 to 30 mm.

17. An apparatus as claimed in claim 12, wherein the first power wire is electrically connected to the first end of the first conductive coil and the second power wire electrically is connected to the second end of the first conductive coil, and the apparatus comprises:

a third power wire electrically connected to the first end of the second conductive coil;

a fourth power wire electrically connected to the second end of the second conductive coil, wherein the first and second power wires are arranged to provide electric current to the first conductive coil and the third and fourth power wires are arranged to provide electric current to the second conductive coil.

18. An apparatus as claimed in claim 12, wherein the first conductive coil is formed of wire having a first width and the second conductive coil is formed of a wire having a second width different to the first width.

19. An apparatus as claimed in claim 18, wherein the wire is substantially rectangular in cross-section.

20. An apparatus as claimed in claim 19, wherein the first conductive coil is formed of wire having a thickness in the range 0.1 mm +30% and a width in the range 2.75 mm +30%, and the second conductive coil is formed of wire having a thickness in the range 0.05 mm +30% and a width in the range 5.95 mm +30%.

21. An apparatus as claimed in claim 12, wherein the first and second conductive coils comprise an equal number of turns.

22. An apparatus as claimed in claim 12, wherein the receiving portion comprises a tube arranged to receive a cylindrical consumable article comprising aerosolizable material.

23. An apparatus as claimed in claim 22, wherein each of the first and second clamping elements comprises one or more alignment protrusions arranged to engage with the tube to center the tube within the clamping structure.

24. An apparatus as claimed in claim 22, wherein the conductive coil is arranged in a helix around the tube.

25. An apparatus as claimed in claim 22, wherein the tube comprises a metal material.

26. An apparatus as claimed in claim 22, wherein the tube comprises aluminum.

27. An apparatus as claimed in claim 22, comprising a layer of dielectric material disposed between the tube and the conductive coil.

28. An apparatus as claimed in claim 2, comprising: a cleanout tube arranged to provide an air path into the receiving portion; and an expansion chamber arranged to provide access for receiving a consumable article in the receiving portion and to provide an air path out of the receiving portion, wherein the cleanout tube and the expansion chamber are each arranged to receive an end of the clamping structure to hold the first clamping element in contact with the second clamping element to clamp the conductive coil to the receiving portion.

29. An apparatus as claimed in claim 28, comprising:

a sleeve arranged to contain the clamping structure and the conductive coil;

a first sealing component arranged to form an air seal between the sleeve and the cleanout tube; and a second sealing component arranged to form an air seal between the sleeve and the expansion chamber.

30. An apparatus as claimed in claim 28, wherein the cleanout tube and/or the expansion chamber is formed of zirconia.

31. An apparatus as claimed in claim 28, wherein the expansion chamber is arranged to enable aerosol formed in the receiving portion to expand and cool.

32. An apparatus as claimed in claim 28, wherein the cleanout tube comprises a channel and wherein one or more of the first, second, third and fourth power wires is routed through the channel.

33. An apparatus as claimed in 32, wherein the clamping structure comprises an indention arranged to provide access to the channel.

34. An apparatus as claimed in claim 32, wherein the channel comprises a sealing component that is arranged to provide a seal around the first, second, third and fourth power wires.

35. An apparatus as claimed in claim 1, wherein the conductive coil comprises one or more of: aluminum, manganin, copper, steel, constantan, nickel, nichrome, stainless steel, and silver.

36. A method of manufacturing an apparatus arranged to heat aerosolizable material, the method comprising:

forming a conductive coil around an elongate receiving portion arranged to receive a consumable article comprising aerosolizable material, the conductive coil comprising a first end and a second end opposite the opposite the first end; and applying a clamping structure to the conductive coil, the clamping structure comprising a first engagement portion arranged to apply a first force to the first end and a second engagement portion arranged to apply a second force, opposing the first force, to the second end, to provide a tension in the conductive coil.

* * * * *